Jan. 2, 1962 H. EPPERLEIN 3,015,207
BALANCE WHEEL ASSEMBLY
Filed Jan. 9, 1959
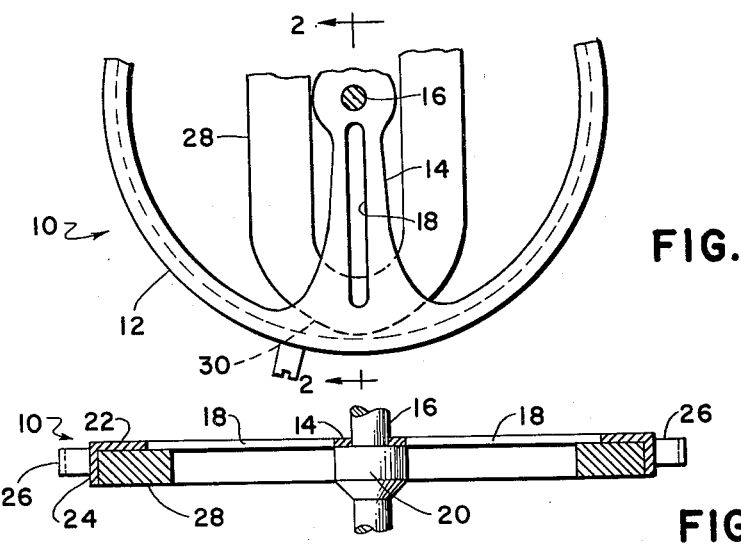
FIG. 1.
FIG. 2.
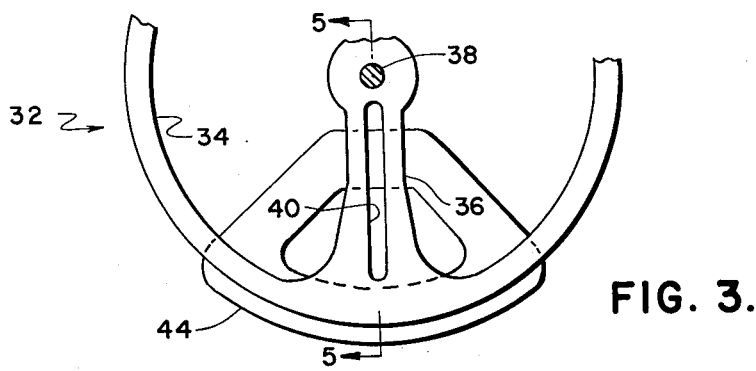
FIG. 3.
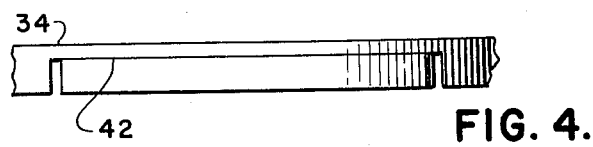
FIG. 4.
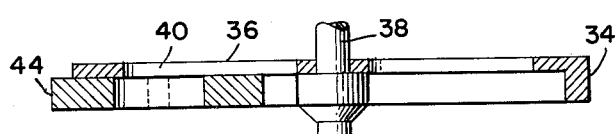
FIG. 5
INVENTOR
*Helmut Epperlein*
BY *Diggins & LeBlanc*
ATTORNEYS

United States Patent Office 3,015,207
Patented Jan. 2, 1962

3,015,207
BALANCE WHEEL ASSEMBLY
Helmut Epperlein, Ersingen, near Pforzheim, Germany, assignor to Hamilton Watch Company, Lancaster, Pa., a corporation of Pennsylvania
Filed Jan. 9, 1959, Ser. No. 785,843
2 Claims. (Cl. 58—28)

This invention relates to a battery powered electric watch of the type having a coil carried by the balance wheel and more particularly relates to an improved balance wheel and coil assembly.

In battery powered electric watches of the type wherein the balance wheel carries a coil which cooperates with stationary magnets in order to provide the motive power for the watch, stringent limitations are placed upon both the thickness of the watch and the type of materials which may be utilized in the balance wheel and coil assembly. That is to say, the balance wheel and coil assembly must be quite thin in order to conserve the limited space available in the watch and no magnetic parts should be used on the assembly.

According to the present invention the foregoing requirements are met by providing a balance wheel and coil assembly having a thickness no greater than that of the balance wheel alone, while preserving a full blance wheel rim so as to afford high structural rigidity. The coil may be received completely within the periphery of the balance wheel and mounted directly beneath the balance wheel cross-arm. Alternatively, the coil may extend beyond the rim of the balance wheel which may be cut-away for this purpose.

It is accordingly a primary object of the present invention to provide a balance wheel and coil assembly for a battery operated electric watch having high structural rigidity and minimum thickness in the direction of the axis of oscillation of the balance wheel.

It is another object of the invention to provide a balance wheel and coil assembly of the foregoing type wherein the coil is received beneath the cross-arm of the balance wheel.

It is another object of the invention to provide a balance wheel and coil assembly of the foregoing type wherein the thickness of the assembly is no greater than that of the balance wheel alone and the balance wheel is provided with a continuous rim.

These and further objects and advantages of the invention will become more apparent upon reference to the following specification and claims and the appended drawings wherein:

FIGURE 1 is a partial plan view showing a balance wheel and coil assembly constructed according to one embodiment of this invention;

FIGURE 2 is a vertical section of the assembly of FIGURE 1 taken along the line 2—2 of FIGURE 1;

FIGURE 3 is a partial plan view showing a balance wheel and coil assembly according to another embodiment of the invention;

FIGURE 4 is a partial vertical elevation of the coil assembly of FIGURE 3; and

FIGURE 5 is a vertical section of the assembly of FIGURE 3 taken along the line 5—5 of FIGURE 3.

Referring more particularly to FIGURES 1 and 2 of the drawings, there is seen a balance wheel indicated generally at 10 having a rim 12 and cross-arm 14 mounted on a balance staff 16. The cross-arm is slotted at 18 and is attached to a collet 20.

Referring to FIGURE 2, the rim 12 consists of a ring 22 of thin metal attached to the cross arm 14 and a thin flange 24 depending from this ring, which flange receives poising screws 26. A multi-turn O-shaped coil 28 is received beneath ring 22 and within the flange 24. This coil has its ends 30 beneath the cross-arm 14, a construction which has been found advantageous. The coil may be secured to the cross-arm and/or depending flange 24 by cement or other suitable means and connections may be made to the coil in a manner which will be understood by those skilled in the art.

Referring to FIGURES 3, 4 and 5, there is shown an alternative embodiment of the invention wherein a balance wheel indicated generally at 32 is provided with a rim 34 supported on a cross-arm 36 and balance staff 38. The cross-arm is slotted at 40 as in the preceding embodiment of the invention.

According to this embodiment of the invention the rim 34 is solid except that it is cut-away at 42 at one side of the balance wheel to receive a sector shaped coil 44 which is of a lesser thickness than the rim 34. As in the preceding embodiment of the invention, the coil is received beneath the arm 36. While the coil shown extends beyond the periphery of the rim, it will be apparent that the dimensions of the coil could be such that it lay completely within the periphery of the rim of the balance wheel.

According to each of the foregoing embodiments of the invention, there is provided a balance wheel and coil assembly wherein the thickness of the sub-assembly is no greater than that of the rim of the balance wheel. In both instances, the coil is of a lesser thickness than the balance wheel and is situated beneath the balance wheel cross-arm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A balance wheel and coil assembly comprising a balance wheel having a cross-arm and rim and adapted to be mounted on a balance staff; said cross-arm including a portion having a thickness in the direction of the axis of said staff less than the maximum thickness of said rim in the same direction, said rim being provided with a radial slot in a section thereof, said section including the area where said cross-arm joins said rim, the thickness of said slotted section of said rim and said portion of said cross-arm being substantially equal; and a coil, said coil being received in said slot beneath said rim section and said cross-arm portion.

2. A balance wheel and coil assembly as defined in claim 1 wherein the overall thickness of said assembly in the direction of said axis is no greater than the maximum thickness of said rim in the same direction.

References Cited in the file of this patent
UNITED STATES PATENTS

| | | |
|---|---|---|
| 2,495,858 | Marti | Jan. 31, 1950 |
| 2,883,827 | Ensign et al. | Apr. 28, 1959 |

FOREIGN PATENTS

| | | |
|---|---|---|
| 1,006,640 | France | Jan. 30, 1952 |
| 1,012,375 | France | Apr. 16, 1952 |